US010671489B2

(12) United States Patent
Cook et al.

(10) Patent No.: US 10,671,489 B2
(45) Date of Patent: *Jun. 2, 2020

(54) VARIABLE CHECKPOINTING IN A STREAMING APPLICATION WITH ONE OR MORE CONSISTENT REGIONS

(71) Applicant: International Business Machines Corporation, Armonk, NY (US)

(72) Inventors: Alexander Cook, London (GB); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,731

(22) Filed: Mar. 16, 2019

(65) Prior Publication Data

US 2019/0213083 A1 Jul. 11, 2019

Related U.S. Application Data

(63) Continuation of application No. 15/598,054, filed on May 17, 2017, now Pat. No. 10,360,109, which is a
(Continued)

(51) Int. Cl.
*G06F 11/14* (2006.01)
*G06F 16/901* (2019.01)
*G06F 16/2455* (2019.01)

(52) U.S. Cl.
CPC ...... *G06F 11/1461* (2013.01); *G06F 11/1438* (2013.01); *G06F 16/24568* (2019.01);
(Continued)

(58) Field of Classification Search
CPC .. G06F 11/14; G06F 11/1461; G06F 11/1438; G06F 16/24
(Continued)

(56) References Cited

U.S. PATENT DOCUMENTS 4,665,520 A 5/1987 Strom et al.
6,154,876 A 11/2000 Haley et al.
(Continued)

FOREIGN PATENT DOCUMENTS

WO 2013052562 A1 4/2013

OTHER PUBLICATIONS

Ni et al., "ACR: Automatic Checkpoint/Restart for Soft and Hard Error Protection", in Proceedings of the International Conference on High Performance Computing, Networking, Storage and Analysis, p. 1-12, 2013.
(Continued)

*Primary Examiner* — Kamini B Patel
(74) *Attorney, Agent, or Firm* — Martin & Associates, LLC; Derek P. Martin (57) ABSTRACT

A variable checkpoint mechanism in a streams manager checkpoints a streaming application based on periodic time periods for checkpoints. The variable checkpoint mechanism can take a checkpoint before a periodic time period ends when a spike is coming, or can take a checkpoint after the periodic time period ends when there is backpressure in a consistent region of the streaming application. When there is no anticipated spike coming and when there is no backpressure in a consistent region of the streaming application, the checkpoint is performed at the normal end of the periodic time period for checkpoints. In this manner the checkpoint timing of the variable checkpoint mechanism can be adjusted real-time to minimize the negative impact of checkpointing on the performance of the streaming application.

11 Claims, 4 Drawing Sheets

Related U.S. Application Data continuation of application No. 15/294,367, filed on Oct. 14, 2016, now Pat. No. 9,678,837.

(52) U.S. Cl.
CPC ...... *G06F 16/9024* (2019.01); *G06F 11/1474* (2013.01); *G06F 2201/805* (2013.01); *G06F 2201/84* (2013.01)

(58) Field of Classification Search
USPC .................................................. 714/16.1, 15
See application file for complete search history.

(56) References Cited

U.S. PATENT DOCUMENTS

| | | | |
|---|---|---|---|
| 6,332,199 B1 | 12/2001 | Meth et al. | |
| 6,671,821 B1 | 12/2003 | Castro et al. | |
| 7,305,582 B1 | 12/2007 | Moser et al. | |
| 8,527,650 B2* | 9/2013 | Craft ................... | G06F 11/1438 709/220 |
| 8,572,051 B1 | 10/2013 | Chen et al. | |
| 8,943,366 B2* | 1/2015 | Carey ................. | G06F 11/0709 714/37 |
| 9,298,788 B1 | 3/2016 | Kekre et al. | |
| 9,405,854 B2 | 8/2016 | Jerzak et al. | |
| 9,459,757 B1 | 10/2016 | Barsness et al. | |
| 9,471,438 B1 | 10/2016 | Jacques Da Silva et al. | |
| 9,641,580 B2 | 5/2017 | Zhou et al. | |
| 9,674,230 B1 | 6/2017 | Barsness et al. | |
| 9,678,837 B1* | 6/2017 | Cook ................... | G06F 11/1461 |
| 9,720,785 B1* | 8/2017 | Cook ................... | G06F 11/1461 |
| 9,891,942 B2 | 2/2018 | Bragstad et al. | |
| 9,954,921 B2 | 4/2018 | Lee | |
| 10,061,858 B2 | 8/2018 | Park et al. | |
| 2006/0004860 A1 | 1/2006 | Liedes et al. | |
| 2009/0106189 A1 | 4/2009 | Jain et al. | |
| 2009/0106214 A1 | 4/2009 | Jain et al. | |
| 2010/0293532 A1* | 11/2010 | Andrade ............. | G06F 11/1438 717/140 |
| 2012/0179809 A1 | 7/2012 | Barsness et al. | |
| 2013/0031335 A1* | 1/2013 | Santosuosso ......... | H04L 65/608 712/30 |
| 2013/0031556 A1* | 1/2013 | Branson ................ | G06F 9/4887 718/103 |
| 2013/0166948 A1* | 6/2013 | Branson .............. | G06F 11/0793 714/15 |
| 2013/0179591 A1 | 7/2013 | Branson et al. | |
| 2014/0215184 A1* | 7/2014 | Branson ................. | G06F 15/80 712/30 |
| 2014/0237134 A1 | 8/2014 | Branson et al. | |
| 2014/0304545 A1 | 10/2014 | Chen et al. | |
| 2014/0317448 A1* | 10/2014 | Rash ................... | G06F 11/1446 714/15 |
| 2014/0351233 A1 | 11/2014 | Crupi et al. | |
| 2014/0373019 A1* | 12/2014 | Branson .................... | G06F 9/46 718/102 |
| 2015/0370800 A1 | 12/2015 | Branson et al. | |
| 2015/0370837 A1 | 12/2015 | Branson et al. | |

OTHER PUBLICATIONS

Madsen et al., "Dynamic Resource Management in a Massively Parallel Stream Processing Engine", in Proceedings of the 24th ACM International on Conference on Information and Knowledge Management, pp. 13-22, 2015.

Zheng, Fang, "Incremental Checkpointing in Streams V4.1", Dec. 2, 2015.

Cook et al., "Variable Checkpointing in a Streaming Application With One or More Consistent Regions", U.S. Appl. No. 15/294,367, filed Oct. 14, 2016.

Cook et al., "Variable Checkpointing in a Streaming Application With One or More Consistent Regions", U.S. Appl. No. 15/598,054, filed May 17, 2017.

Cook et al., "Variable Checkpointing in a Streaming Application With One or More Consistent Regions", U.S. Appl. No. 16/357,304, filed Mar. 18, 2019.

Cook et al., "Variable Checkpointing in a Streaming Application That Includes Tuple Windows", U.S. Appl. No. 15/294,404, filed Oct. 14, 2016.

Cook et al., "Variable Checkpointing in a Streaming Application That Includes Tuple Windows", U.S. Appl. No. 15/633,191, filed Jun. 26, 2017.

Appendix P—List of IBM Patents or Patent Applications Treated as Related, dated Apr. 15, 2019.

* cited by examiner

VARIABLE CHECKPOINTING IN A STREAMING APPLICATION WITH ONE OR MORE CONSISTENT REGIONS

BACKGROUND

1. Technical Field

This disclosure generally relates to streaming applications, and more specifically relates to checkpointing streaming applications that have one or more consistent regions.

2. Background Art

Streaming applications are known in the art, and typically include multiple processing elements coupled together in a flow graph that process streaming data in near real-time. A processing element typically takes in streaming data in the form of data tuples, operates on the data tuples in some fashion, and outputs the processed data tuples to the next processing element. Streaming applications are becoming more common due to the high performance that can be achieved from near real-time processing of streaming data.

Checkpointing is well-known in the art of computer programs as the process of saving the state of a computer program periodically as it runs so the state of the computer program can be restored should a failure occur. Checkpointing a streaming application brings some additional challenges, because the performance cost of checkpointing can often negatively affect the performance of a streaming application, which typically needs to process a data stream in near real-time. It is known in the art of streaming applications to checkpoint periodically, meaning a full checkpoint is taken at set time intervals. Thus, if the selected time interval is 30 seconds, this means every 30 seconds the streaming application will create a checkpoint of the state of the processing elements in the flow graph.

Because checkpointing can negatively affect the performance of streaming applications, incremental checkpoints have been developed that allow taking a full checkpoint, followed by multiple "delta checkpoints" that reflect the changes since the last checkpoint, whether a full checkpoint or another delta checkpoint. Delta checkpoints are typically much smaller than full checkpoints, which affects the performance of the streaming application less than when full checkpoints are taken at each periodic interval.

Early streaming applications often could not guarantee each data tuple would be processed, which means some data tuples were at risk of being lost. Later developments included the identification of consistent regions in the flow graph that guarantees at least one, and in many cases exactly once, process of data tuples. Using the periodic checkpointing known in the art can result in significant performance penalties when a checkpoint is forced at the time when there is backpressure in a consistent region of the flow graph, meaning the consistent region has a backup of data tuples to process.

BRIEF SUMMARY

A variable checkpoint mechanism in a streams manager checkpoints a streaming application based on periodic time periods for checkpoints. The variable checkpoint mechanism can take a checkpoint before a periodic time period ends when a spike is coming, or can take a checkpoint after the periodic time period ends when there is backpressure in a consistent region of the streaming application. When there is no anticipated spike coming and when there is no backpressure in a consistent region of the streaming application, the checkpoint is performed at the normal end of the periodic time period for checkpoints. In this manner the checkpoint timing of the variable checkpoint mechanism can be adjusted real-time to minimize the negative impact of checkpointing on the performance of the streaming application.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein are directed to a variable checkpoint mechanism in a streams manager that checkpoints a streaming application based on periodic time periods for checkpoints. The variable checkpoint mechanism can take a checkpoint before a periodic time period ends when a spike is coming, or can take a checkpoint after the periodic time period ends when there is backpressure in a consistent region of the streaming application. When there is no anticipated spike coming and when there is no backpressure in a consistent region of the streaming application, the checkpoint is performed at the normal end of the periodic time period for checkpoints. In this manner the checkpoint timing of the variable checkpoint mechanism can be adjusted real-time to minimize the negative impact of checkpointing on the performance of the streaming application.

Figure 1:
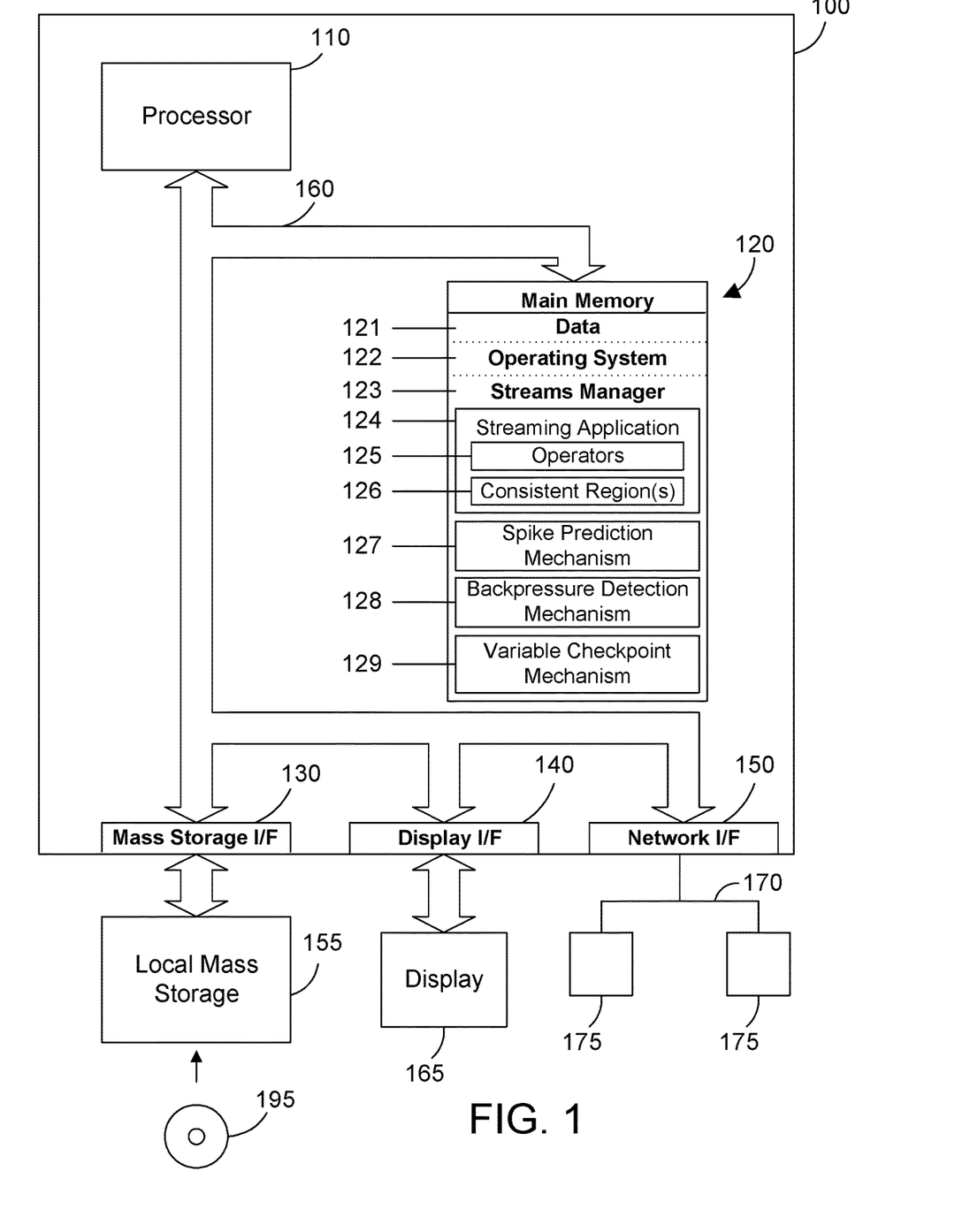
FIG. 1 is a block diagram of a computer system that includes a variable checkpoint mechanism in a streams manager that can adjust the time of taking checkpoints based on conditions in the streaming application.

Referring to FIG. 1, a computer system 100 is one suitable implementation of a server computer system that includes a variable checkpoint mechanism in a streams manager as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a runtime environment that executes a streaming application 124. The streaming application 124 preferably comprises a flow graph that includes processing elements that include operators 125 that process data tuples. The streaming application 124 preferably includes one or more consistent regions 126. A consistent region 126 as used herein is a region of the flow graph where all data tuples must be processed, and in some cases, where all data tuples must be processed exactly once. As discussed in the Background section above, using the periodic checkpointing known in the art can result in significant performance penalties when a checkpoint is forced at a time when there is backpressure in a consistent region of the flow graph. As a result, the streams manager 123 includes a variable checkpoint mechanism 129 that can perform checkpointing at different times than at the end of the normal periodic time periods when conditions in the streaming application are such that advancing or delaying the time for taking a checkpoint is beneficial.

Figure 4:
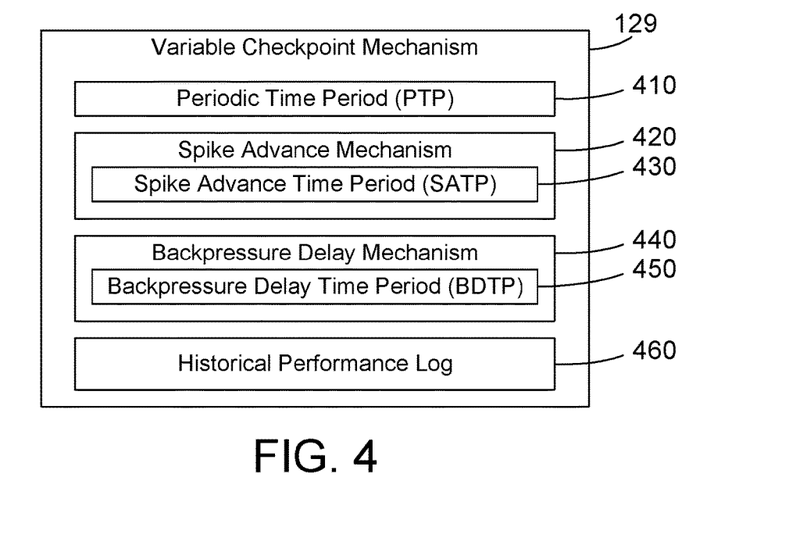
FIG. 4 shows possible details of the variable checkpoint mechanism 129 shown in FIG. 1.

The streams manager 123 includes a spike prediction mechanism 127 that can predict when spikes in tuple rates are going to occur based on information in a historical performance log, such as 460 shown in FIG. 4. For example, the historical performance log could indicate that a spike in tuple rate occurs each morning at 8:05 AM, or that a spike in tuple rate occurs every 6 minutes. Based on the information in the historical performance log, the spike prediction mechanism 127 can predict many spikes in tuple rates before they occur. By knowing when a spike in tuple rate is coming based on the spike prediction mechanism 127, the variable checkpoint mechanism 129 can advance the time for performing a checkpoint so the checkpoint is completed before the spike is expected to arrive.

The streams manager 123 also includes a backpressure detection mechanism 128 that detects when one or more operators 125 in the streaming application have backpressure. Backpressure means an operator has a backup of multiple data tuples to process due to the operator processing the data tuples more slowly than the data tuples are arriving at the input of the operator. The backpressure detection mechanism 128 monitors backpressure in the streaming application 124, including the consistent region(s) 126 of the streaming application. The variable checkpoint mechanism 129 can use information from the backpressure detection mechanism 128 to delay a checkpoint past the end of periodic time period when one or more consistent regions 126 have backpressure, which avoids the performance cost of performing checkpointing at a time when there is backpressure in the consistent region(s) 126.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, which includes the variable checkpoint mechanism 129.

Although computer system 100 is shown to contain only a single processor and a single system bus, those skilled in the art will appreciate that a variable checkpoint mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
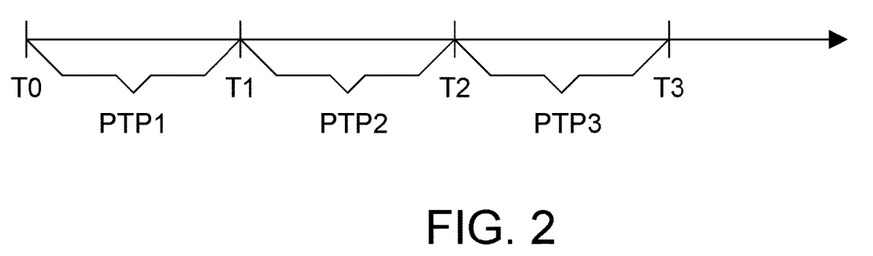
FIG. 2 is a timeline showing checkpointing at periodic time periods.

FIG. 2 shows a timeline that illustrates performing checkpoints at times defined by a periodic time period. T0 represents when the streaming application begins to execute.

PTP1 represents a first periodic time period, which begins at T0 and ends at T1. PTP2 represents a second periodic time period, which begins at T1 and ends and T2. PTP3 represents a third periodic time period, which begins at T2 and ends at T3. In this specific example, checkpoints are taken at the end of each periodic time period, which means at T1 (the end of PTP1), at T2 (the end of PTP2), and at T3 (the end of PTP3). The timeline in FIG. 2 simply shows that checkpoints are performed based on a defined periodic time period that is of the same duration for each time period.

Figure 3:
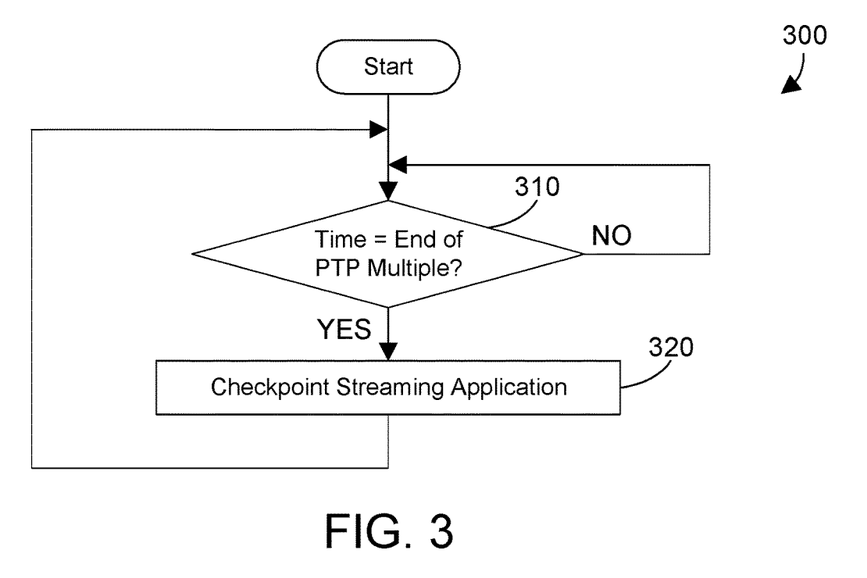
FIG. 3 is a flow diagram of a method for performing the checkpointing at periodic time periods shown in FIG. 2.

Referring to FIG. 3, a method 300 represents how checkpointing as shown in the timeline in FIG. 2 is performed. When the current time is not at the end of a multiple of the periodic time period PTP (step 310=NO), method 300 loops back until the current time is the end of a multiple of the PTP (step 310=YES), at which point the streaming application is checkpointed (step 320). Method 300 then loops back and continues, checkpointing the streaming application (step 320) each time the current time is at the end of a multiple of the periodic time period PTP (step 310=YES).

Performing checkpoints at rigid time intervals defined by a periodic time period can result in the need to perform a checkpoint at times that can significantly impact system performance. A purpose of the variable checkpoint mechanism disclosed and claimed herein is to provide flexibility to advance or delay checkpointing according to either predicted conditions or actual conditions in the streaming application.

Referring to FIG. 4, the variable checkpoint mechanism 129 in FIG. 1 is shown with additional details. The variable checkpoint mechanism 129 includes a periodic time period PTP 410. This time period is similar to the periodic time period shown in FIG. 2 and referenced in FIG. 3, and most preferably comprises a time interval for performing checkpointing, such as 30 seconds. In the specific examples shown herein, the periodic time period is the same duration for all periodic time periods. Note, however, the periodic time periods could have different durations within the scope of the disclosure and claims herein. Using the example of a periodic time period of 30 seconds that is the same duration for all periodic time periods, the variable checkpoint mechanism 129 will take a checkpoint every 30 seconds unless conditions warrant advancing or delaying the taking of the checkpoint, as discussed in more detail below. A spike advance mechanism 420 includes a spike advance time period SATP 430, which is a time before each periodic time period during which the variable checkpoint mechanism 129 can perform a checkpoint when the spike prediction mechanism 127 predicts an upcoming spike in data tuples and there is sufficient time before the spike to perform the checkpoint. A simple example will illustrate. Let's assume the periodic time period PTP 410 is set to 30 seconds, and let's further assume the variable checkpoint mechanism 129 takes two seconds to take a checkpoint. Let's further assume the spike advance time period SATP 430 is set to eight seconds, meaning the time for performing the checkpoint can be advanced up to eight seconds based on a predicted spike in data tuples. We now assume the spike prediction mechanism 127 predicts a spike in data tuples two seconds before the end of a 30 second PTP 410. Because checkpointing during a spike in tuples is not desirable because it lengthens the time for processing the data tuples, the variable checkpoint mechanism 129 advances the time of the checkpoint. Thus, the variable checkpoint mechanism 129 could advance the time of the checkpoint to 25 seconds instead of 30 seconds, which means the checkpoint will complete at 27 seconds into the periodic time period, a full second before the spike in data tuples is expected to happen at 28 seconds. By advancing the checkpointing to occur before the predicted spike in data tuples, the checkpointing is done at a time when the streaming application is not as busy.

The variable checkpoint mechanism 129 in FIG. 4 further includes a backpressure delay mechanism 440 that allows the time for a checkpoint to be delayed within a backpressure delay time period BDTP 450 when one or more consistent regions of the streaming application have backpressure, meaning they are receiving data tuples faster than they can process the data tuples. Another simple example will illustrate. We assume the PTP 410 is set to 30 seconds, and the variable checkpoint mechanism 129 takes two seconds to take a checkpoint. We further assume the BDTP 450 is set to 10 seconds. We assume at the time 30 seconds that represents the end of the next periodic time period, the backpressure detection mechanism 128 in FIG. 1 detects backpressure in one or more consistent regions 126 of the streaming application 124. Because of the backpressure at the time a checkpoint should normally be performed, the variable checkpoint mechanism 129 delays taking the checkpoint. The backpressure delay mechanism 440 continues to delay taking the checkpoint until either the backpressure is eliminated, or the BDTP 450 expires, whichever comes first. Thus, if the backpressure is eliminated at 5 seconds after the 30 second PTP expires, the variable checkpoint mechanism will take the checkpoint at the 35 second point instead of at the end of the normal 30 second PTP. If the backpressure is not eliminated from the consistent region(s) within 10 seconds after the end of the PTP, the variable checkpoint mechanism 129 will then force the checkpoint to be taken notwithstanding the backpressure. In many instances the backpressure will be cleared well within the time of the BDTP 450, allowing the checkpoint to be delayed until a time when the streaming application is less busy.

The variable checkpoint mechanism 129 may also include a historical performance log 460. Note this log could be part of the variable checkpoint mechanism 129, or could be part of the streaming application 124 shown in FIG. 1. The historical performance log 460 logs the performance of one or more operators 125 in one or more processing elements. The spike prediction mechanism 127 preferably accesses the historical performance log 460 in order to predict when a spike in tuple rate is expected to occur.

Figure 5:
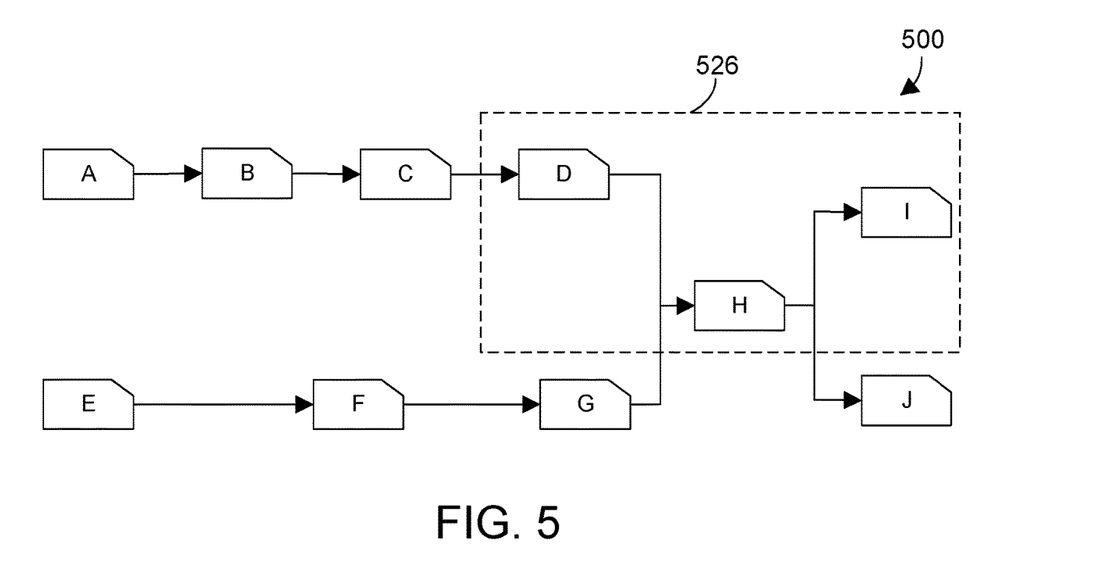
FIG. 5 is a block diagram of a sample streaming application that includes a consistent region 526.

Referring to FIG. 5, an extremely simplified streaming application 500 is shown for the purposes of illustrating the concepts herein. The streaming application 500 includes ten operators A, B, C, D, E, F, G, H, I and J. Operator A produces data tuples that are sent to operator B. Operator B operates on the data tuples received from operator A and sends the resulting data tuples to operator C. Operator C operates on the data tuples received from operator B and sends the resulting data tuples to operator D. In similar fashion, operator E produces data tuples that are sent to operator F, which processes those data tuples and sends resulting data tuples to operator G. Operators D and G both send their data tuples to operator H, which processes these data tuples and sends some data tuples to operator I and other data tuples to operator J. We assume for this simple example a consistent region 526 is defined in the streaming application 500. Consistent region 526 is a region where data loss is not acceptable, so each and every data tuple must be processed by operators D, H and I in the consistent region 526. In one specific implementation, this means each and every data tuple in the consistent region 526 must be processed by operators D, H and I exactly once. The consistent region 526 is one suitable example of a consistent region 126 shown in FIG. 1.

Figure 6:
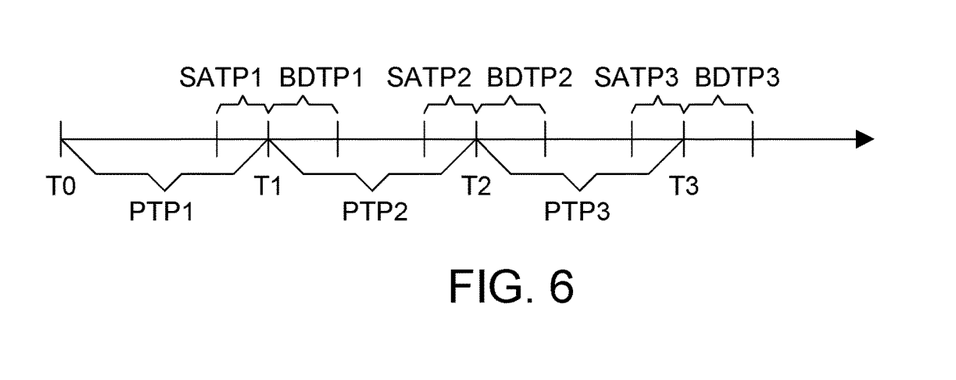
FIG. 6 is a timeline showing a time period before each periodic checkpoint and a time period after each periodic checkpoint that allows adjusting checkpointing to be at different times than at the end of the periodic time periods.

FIG. 6 shows a timeline that includes the period periods PTP1, PTP2 and PTP3, as shown in FIG. 2, but additionally includes other time windows defined by the spike advance time period SATP 420 and the backpressure delay time period BDTP 450 shown in FIG. 4. The SATP 420 defines an interval of time before each PTP and ending with the end of a PTP within which a checkpoint may be performed by the variable checkpoint mechanism when a spike in tuple rate is predicted to occur that will cause the streaming application to be busy at the end the PTP. The BDTP 450 defines an interval of time after the end of each PTP and ending with the BDTP 450 within which a checkpoint may be performed by the variable checkpoint mechanism when there is backpressure in one or more consistent regions of the streaming application. Thus, while the variable checkpoint mechanism still uses the end of each PTP as a target time for taking a checkpoint, this target time can be advanced or delayed according to the conditions in the streaming application as discussed herein so the checkpoint is taken at a time when the streaming application is less busy. In this manner the performance impact of checkpointing on a streaming application is minimized much more so that when checkpoints are forced at the end of every periodic time period.

Figure 7:
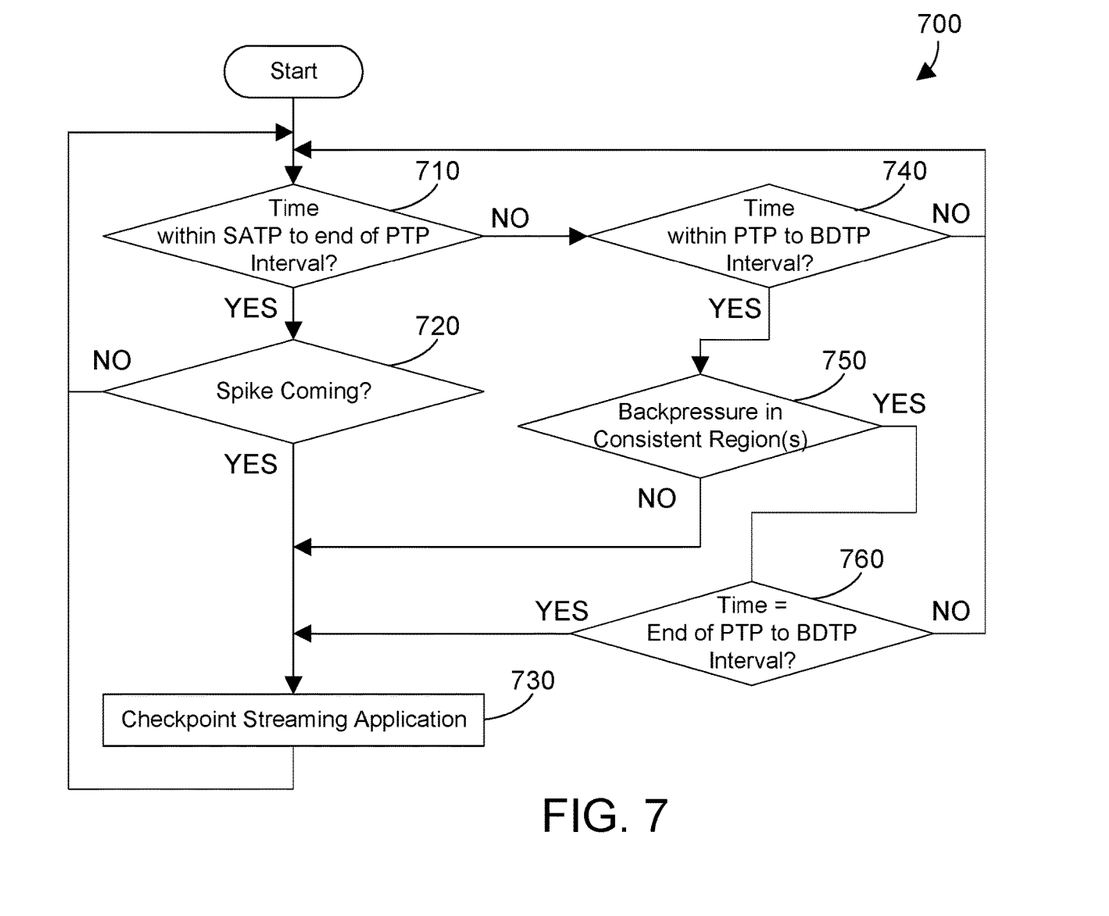
FIG. 7 is a flow diagram of a method for performing variable checkpointing of a streaming application.

Referring to FIG. 7, a method 700 is preferably performed by the variable checkpoint mechanism 129 shown in FIG. 1. Method 700 determines whether the time is within the SATP to end of a PTP interval (step 710). Examples are shown in FIG. 6 as SATP1, SATP2 and SATP3. When the time is within the SATP to end of PTP interval (step 710=YES), and when there is a spike in tuple rate coming (step 720=YES), the checkpoint of the streaming application is taken (step 730), even though the time is before the end of the PTP. Note there are many variables that could come into play. For example, step 720 most preferably means a spike is coming that would potentially interfere with taking the checkpoint at the PTP, meaning the spike is at the end of the next PTP. Step 720 could be determined by the variable checkpoint mechanism in conjunction with the spike prediction mechanism 127 in FIG. 1. The streaming application could be checkpointed immediately in step 730, or could be delayed until a later time within the SATP to PTP interval, as long as the checkpoint can be completed before the predicted spike in tuple rate.

When the time is not within the SATP to PTP interval (step 710=NO), a determination is made whether the time is within the PTP to BDTP interval (step 740). If not (step 740=NO), method 700 loops back to step 710 and continues. When the time is within the PTP to BDTP interval (step 740=YES), when there is no backpressure in one or more consistent regions being checkpointed (step 750=NO), the checkpoint is taken (step 730). When there is backpressure in one or more consistent regions being checkpointed (step 750=YES), a determination is made whether the time for the checkpoint has been delayed until the end of the PTP to BDTP period (step 760). When there is still backpressure (step 750=YES) and the time is at the end of the PTP to BDTP interval (step 760=YES), the checkpoint is taken of the streaming application (step 730). When there is still backpressure (step 750=YES) and the time is not yet to the end of the PTP to BDTP interval (step 760=NO), method 700 loops back to step 710 and continues, delaying the taking of the breakpoint either until the backpressure no longer exists (step 750=NO) or until the end of the PTP to BDTP time interval is reached (step 760=YES), at which point the checkpoint is taken (step 730). Method 700 shows a checkpoint can be advanced in time to avoid a predicted spike in tuple rate, or can be delayed in time to avoid backpressure in one or more consistent regions of the streaming application. In this manner checkpointing is done at times that can vary according to both predicted and actual conditions in the streaming application to enhance the performance of the streaming application by performing checkpointing at times when the streaming application is less busy.

The examples provided herein are extremely simplified to illustrate the general concepts of advancing or delaying the time of taking checkpoints based on conditions in the streaming application. Most streaming applications are significantly more complex than shown in the examples herein. However, one skilled in the art will appreciate the concepts disclosed and claimed herein can extend to a streaming application of any suitable level of complexity with any suitable number of consistent regions.

A variable checkpoint mechanism in a streams manager checkpoints a streaming application based on periodic time periods for checkpoints. The variable checkpoint mechanism can take a checkpoint before a periodic time period ends when a spike is coming, or can take a checkpoint after the periodic time period ends when there is backpressure in a consistent region of the streaming application. When there is no anticipated spike coming and when there is no backpressure in a consistent region of the streaming application, the checkpoint is performed at the normal end of the periodic time period for checkpoints. In this manner the checkpoint timing of the variable checkpoint mechanism can be adjusted real-time to minimize the negative impact of checkpointing on the performance of the streaming application.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streams manager residing in the memory and executed by the at least one processor, the streams manager executing a streaming application that comprises a flow graph that includes a plurality of operators that process a plurality of data tuples; and
a checkpoint mechanism that uses a plurality of periodic time periods for taking checkpoints, and when there is backpressure in a consistent region of the flow graph at a time that includes an end of a second of the periodic time periods, takes a checkpoint late after the end of the second periodic time period, wherein when there is no backpressure in any consistent region at an end of one of the periodic time periods, the checkpoint mechanism takes the checkpoint at the end of the one periodic time period.

2. The apparatus of claim 1 wherein the flow graph comprises a plurality of consistent regions that each comprises at least one of the plurality of operators, wherein each consistent region defines at least one of the plurality of operators that are required to process each data tuple in the consistent region.

3. The apparatus of claim 2 wherein each operator in each consistent region is required to process each data tuple exactly once.

4. The apparatus of claim 1 wherein the checkpoint mechanism further comprises a backpressure delay mechanism that defines a backpressure delay time period after the end of the second periodic time period, wherein when there is backpressure in a consistent region of the flow graph at a time that includes the end of the second periodic time period, the checkpoint mechanism takes the checkpoint late after the end of the second periodic time period and before an end of the backpressure delay time period once the backpressure in the consistent region no longer exists, and when the backpressure exists from a time that includes the end of the second periodic time period to the end of the backpressure delay time period, the checkpoint mechanism takes the checkpoint late at the end of the backpressure delay time period.

5. The apparatus of claim 1 wherein each of the plurality of period time periods has the same duration.

6. A computer-implemented method executed by at least one processor for running streaming applications, the method comprising:
    executing a streams manager that executes a streaming application that comprises a flow graph that includes a plurality of processing elements that process a plurality of data tuples; and
    defining a plurality of periodic time periods for taking checkpoints; and
    when there is backpressure in a consistent region of the flow graph at a time that includes an end of a second of the periodic time periods, taking a checkpoint late after the end of the second periodic time period.

7. The method of claim 6 wherein when there is no backpressure in any consistent region at an end of one of the periodic time periods, taking the checkpoint at the end of the one periodic time period.

8. The method of claim 6 wherein the flow graph comprises a plurality of consistent regions that each comprises at least one of the plurality of operators, wherein each consistent region defines at least one of the plurality of operators that are required to process each data tuple in the consistent region.

9. The method of claim 8 wherein each operator in each consistent region is required to process each data tuple exactly once.

10. The method of claim 6 further comprising defining a backpressure delay time period after the end of the second periodic time period, wherein when there is backpressure in a consistent region of the flow graph at a time that includes the end of the second periodic time period, taking the checkpoint late after the end of the second periodic time period and before an end of the backpressure delay time period once the backpressure in the consistent region no longer exists, and when the backpressure exists from a time that includes the end of the second periodic time period to the end of the backpressure delay time period, taking the checkpoint late at the end of the backpressure delay time period.

11. The method of claim 6 wherein each of the plurality of period time periods has the same duration.

* * * * *